US012586033B1

(12) United States Patent
Safi et al.

(10) Patent No.: US 12,586,033 B1
(45) Date of Patent: Mar. 24, 2026

(54) SYSTEM AND METHOD FOR SELECTIVELY RE-STOCKING INVENTORY STRUCTURES WITH STOCK OF PRODUCT FROM BACK-OF-STORE INVENTORY

(71) Applicant: Simbe Robotics, Inc., South San Francisco, CA (US)

(72) Inventors: Jariullah Safi, South San Francisco, CA (US); Bradley Bogolea, South San Francisco, CA (US); Tom Gehani, South San Francisco, CA (US)

(73) Assignee: Simbe Robotics, Inc., Burlingame, CA (US)

( * ) Notice: Subject to any disclaimer, the term of this patent is extended or adjusted under 35 U.S.C. 154(b) by 0 days.

(21) Appl. No.: 19/079,182

(22) Filed: Mar. 13, 2025

(51) Int. Cl.
| | |
|---|---|
| *G06Q 10/087* | (2023.01) |
| *G06Q 20/20* | (2012.01) |
| *G06V 10/44* | (2022.01) |
| *G06V 20/52* | (2022.01) |
| *G06V 20/58* | (2022.01) |

(52) U.S. Cl.
CPC ......... *G06Q 10/087* (2013.01); *G06Q 20/203* (2013.01); *G06V 10/44* (2022.01); *G06V 20/52* (2022.01); *G06V 20/58* (2022.01)

(58) Field of Classification Search
CPC .............. G06Q 10/087; G06Q 20/203; G06Q 10/0877; G06V 10/44; G06V 20/52; G06V 20/58
See application file for complete search history.

(56) References Cited

U.S. PATENT DOCUMENTS

| | | | | |
|---|---|---|---|---|
| 10,474,994 | B2 * | 11/2019 | Mak .................... | G06Q 10/0875 |
| 2008/0077511 | A1 * | 3/2008 | Zimmerman ........ | G06Q 10/087 |
| | | | | 705/28 |
| 2015/0324779 | A1 * | 11/2015 | Gala ..................... | G06Q 30/06 |
| | | | | 705/22 |
| 2018/0002109 | A1 * | 1/2018 | Yamashita ............. | G06V 10/17 |
| 2018/0060619 | A1 * | 3/2018 | Bathurst ................ | G06Q 10/08 |
| 2018/0060804 | A1 * | 3/2018 | Cheruku .............. | G06Q 20/203 |
| 2019/0244163 | A1 * | 8/2019 | Howard ............... | G06Q 10/107 |
| 2022/0122157 | A1 * | 4/2022 | Ross ................... | G06Q 30/0643 |
| 2023/0306451 | A1 * | 9/2023 | Chaubard .......... | G06Q 30/0202 |

* cited by examiner

*Primary Examiner* — Florian M Zeender
*Assistant Examiner* — Vanessa Deligi
(74) *Attorney, Agent, or Firm* — Run8 Patent Group, LLC; Peter Miller; Leah Raddatz

(57) ABSTRACT

One variation of a method includes: receiving a first image captured by a mobile device in a back-of-store inventory region of a store; identifying a product type represented in the first image; accessing a second image of an inventory structure in a customer region of the store, the second image captured by a mobile robotic system traversing aisles of the store during a scan cycle; based on features extracted from the second image and the set of point-of-sale data, predicting a first quantity of product units of the product type loaded in the slot; and, in response to the first quantity of product units falling below a threshold quantity, generating a prompt to deliver a second quantity of product units from the back-of-store inventory structure to the slot in the inventory structure in the customer region of the store; and transmitting the prompt to the mobile device.

20 Claims, 5 Drawing Sheets

S100

S172

ASSOCIATE ID: 211
LOC: LOC12

@T₁

STORE
ASSOCIATE

COMPUTER
SYSTEM

2A

211
ASSOCIATE

S150

RE-STOCK NOTIFICATION

PRODUCT ID: 77101
QUANTITY: 10 UNITS
URGENCY: MODERATE
CONFIDENCE: 85%

(BACK-OF-STORE
INVENTORY)

(SLOT IN
CUSTOMER REGION)

S152

@T₁⁺

STORE
ASSOCIATE

SYSTEM AND METHOD FOR SELECTIVELY RE-STOCKING INVENTORY STRUCTURES WITH STOCK OF PRODUCT FROM BACK-OF-STORE INVENTORY

TECHNICAL FIELD

This invention relates generally to the field of stock keeping and, more specifically, to a new and useful method for selectively prompting store associates to re-stock products within a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: User-Initiated Scan of Back-of-Store Inventory

Figure 1A:
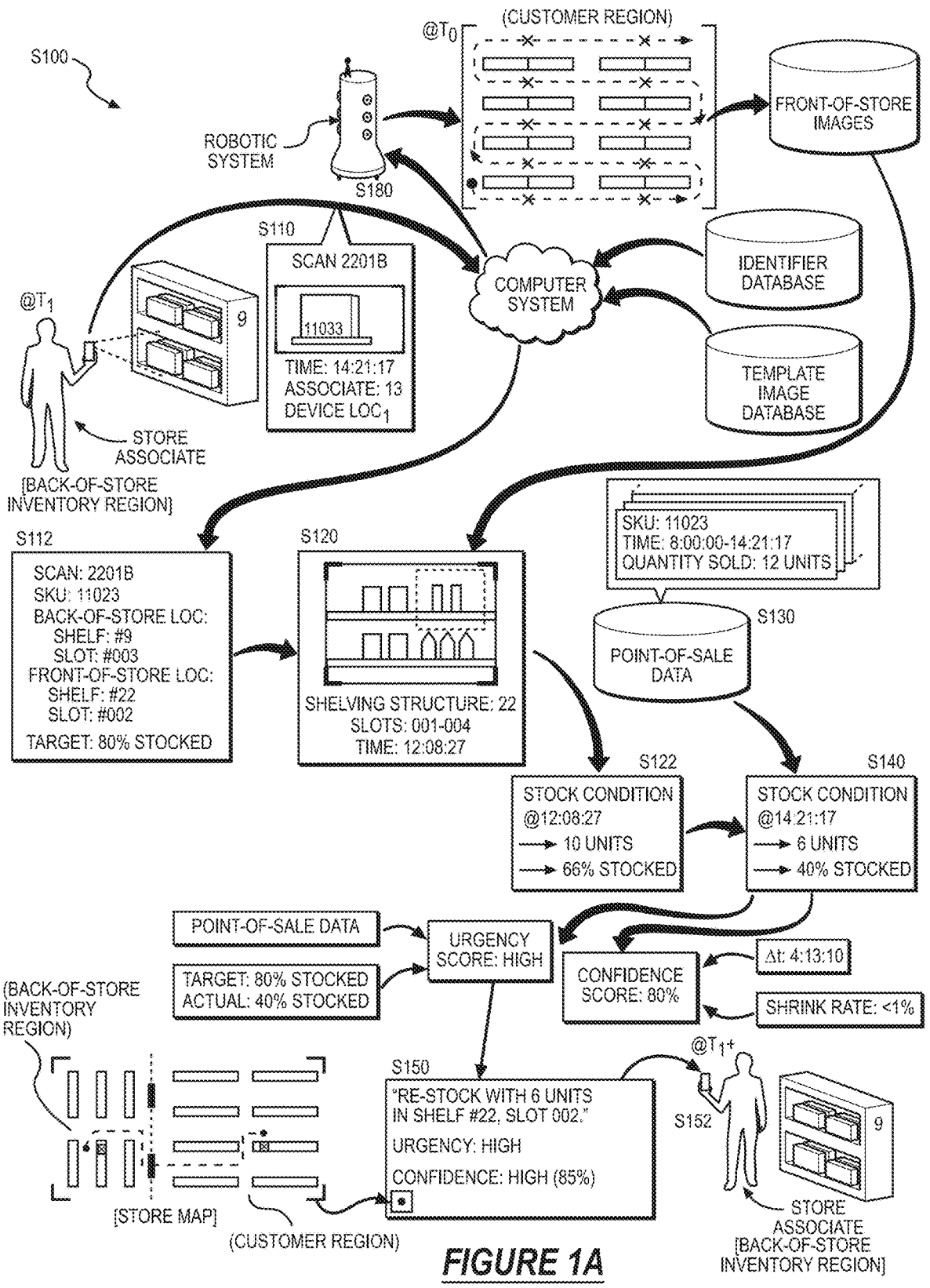
FIGS. 1A and 1B are flowchart representations of a method.
Figure 1B:
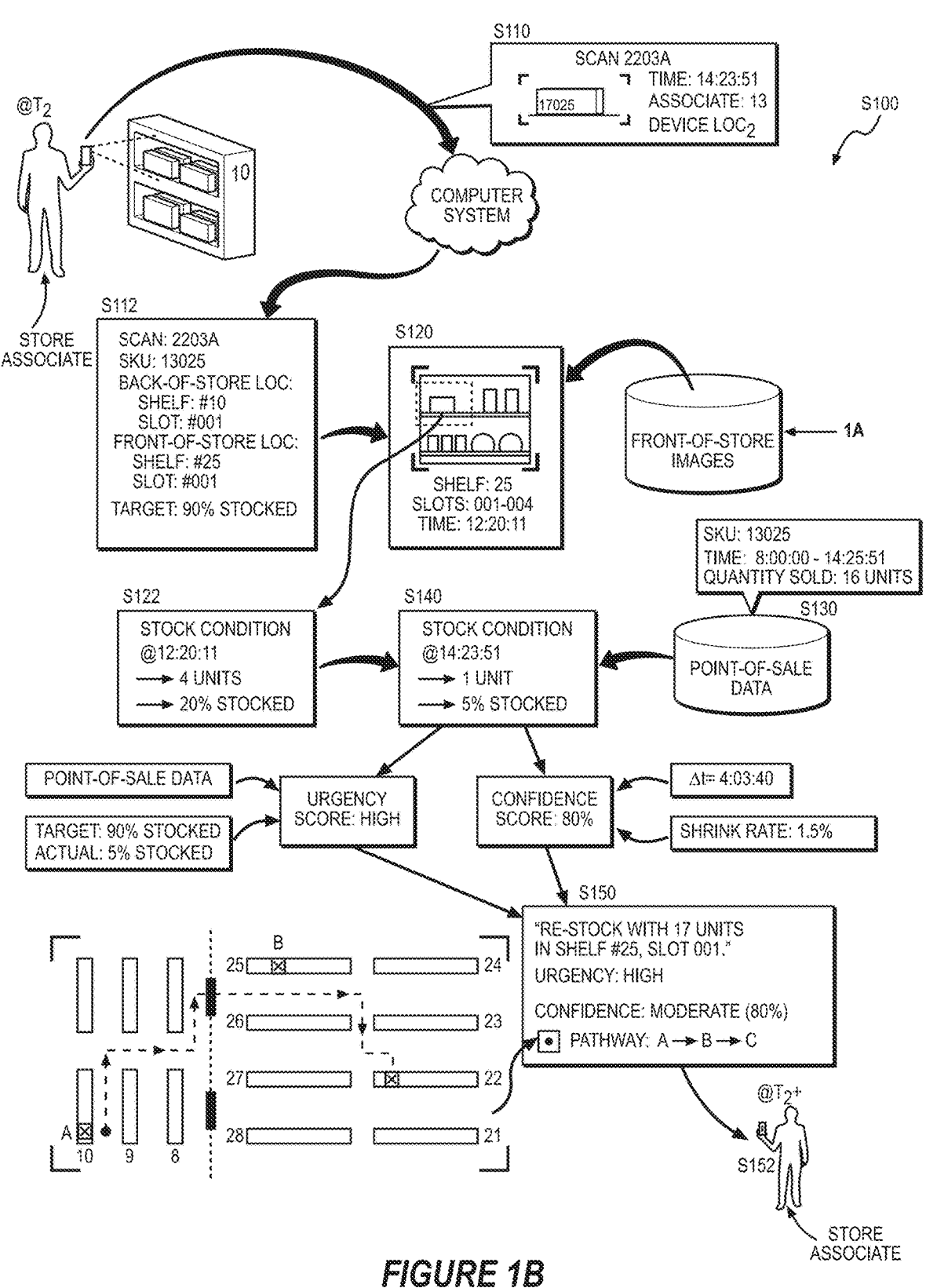
Figure 3:
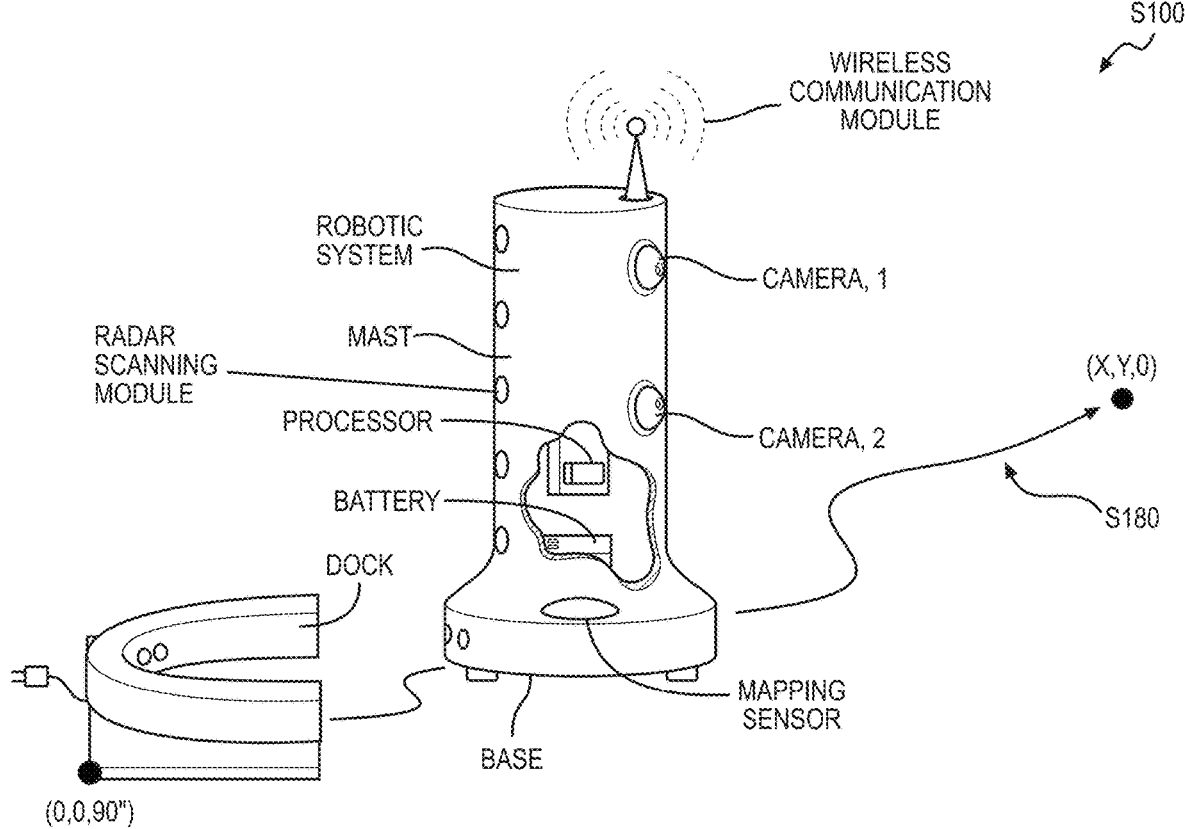
FIG. 3 is a flowchart representation of one variation of the method.

As shown in FIGS. 1A, 1B, and 3, a method S100 includes: at a first time, receiving a first image including visual data captured by a mobile device accessed by a user associated with a store, the first image associated with a first location in a back-of-store inventory region of the store in Block S110; based on features extracted from the first image, identifying a first product type, in a set of product types, represented in the first image in Block S112; accessing a second image of a first slot in a first inventory structure in a customer region of the store, the first slot assigned to the first product type, the second image captured at a second time preceding the first time in Block S120; based on features extracted from the second image, estimating a first stock condition for the first product type in the first slot at the second time in Block S122; accessing a first set of point-of-sale data associated with the first product type and corresponding to a first time period preceding the first time and succeeding the second time in Block S130; and predicting a first quantity of product units of the first product type loaded in the first slot at the first time based on the first set of point-of-sale data and the first stock condition at the second time in Block S140. The method S100 further includes, in response to the first quantity of product units falling below a threshold quantity: generating a re-stock notification including a second quantity of product units of the first product type and a prompt to deliver the second quantity of product units from the back-of-store inventory structure to the first slot in the first inventory structure in the customer region of the store in Block S150; and transmitting the re-stock notification to the user via the mobile device in Block S152.

In one variation, the method S100 further includes deploying a mobile robotic system to autonomously navigate throughout the customer region of the store during a first scan cycle, the mobile robotic system including an optical sensor in Block S180.

One variation of the method S100 includes: at a first time, receiving a first image including visual data from a mobile device accessed by a user associated with a store in Block S110; based on features extracted from the first image, identifying a first set of product units of a first product type in the first image, the first set of product units located in a back-of-store inventory structure in Block S112; accessing a set of point-of-sale data associated with the first product type and corresponding to a first time period preceding the first time in Block S130; accessing a second image of a first slot in a first inventory structure in a customer region of the store, the first slot assigned to the first product type, the second image captured at a second time during the first time period in Block S120; predicting a first stock condition of the first product type in the first slot at the second time based on features extracted from the second image in Block S122; predicting a first quantity of product units of the first product type remaining in the first slot at the first time based on the set of point-of-sale data and the first stock condition in Block S140; and, in response to the first quantity of product units falling below a threshold quantity, generating a re-stock notification including a second quantity of product units of the first product type and a prompt to deliver the second quantity of product units from the back-of-store inventory structure to the first slot in the first inventory structure in the customer region of the store in Block S150, and, transmitting the re-stock notification to the user via the mobile device in Block S152.

1.1 Method: Re-Stock List+Push Notifications

Figure 2A:
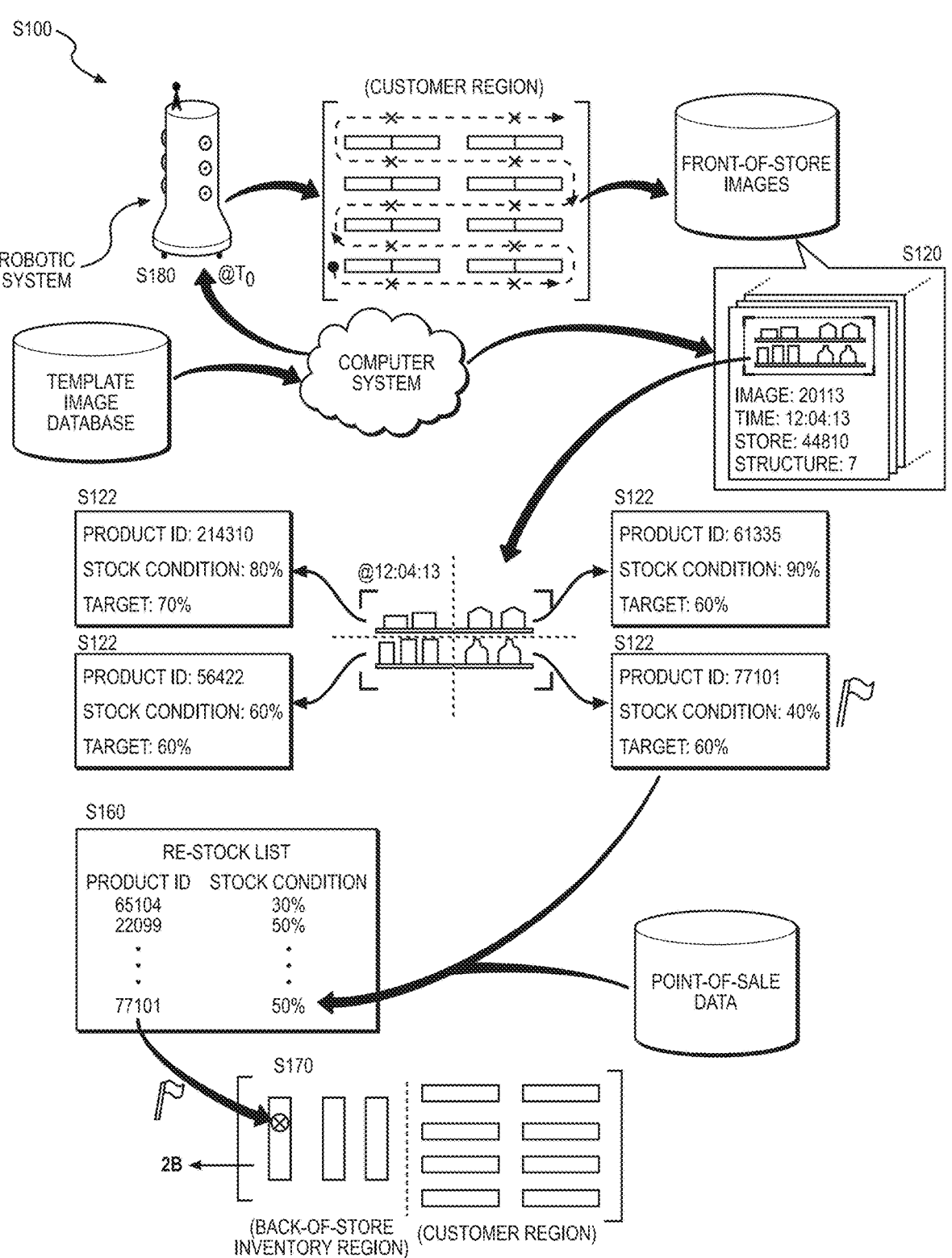
FIGS. 2A and 2B are flowchart representations of one variation of the method.
Figure 2B:
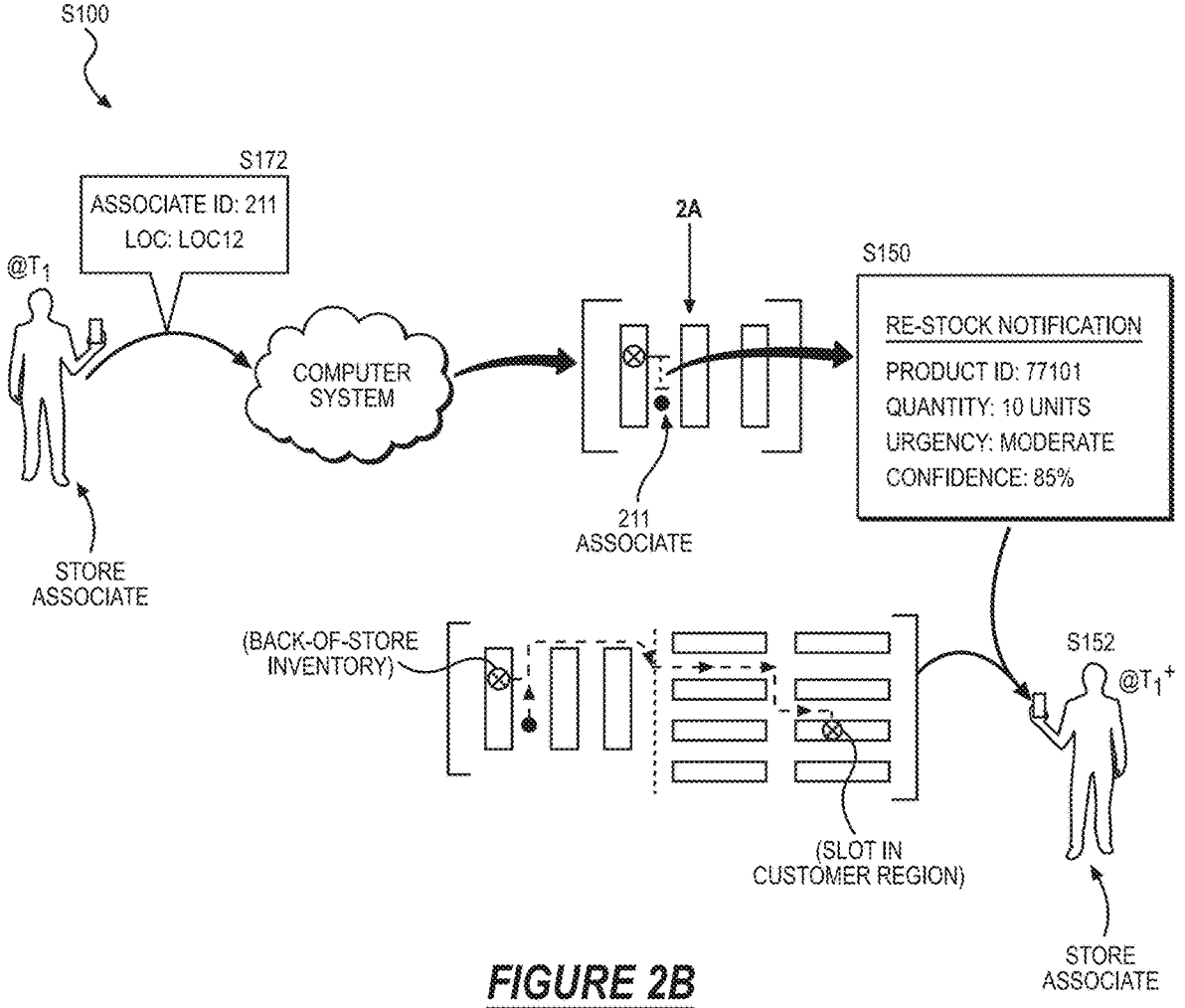

As shown in FIGS. 2A, 2B, and 3, one variation of the method S100 includes accessing a feed of images, depicting a set of inventory structures in a customer region of a store, captured during a scan cycle in Block S120. In this variation, the method S100 further includes, for each product type in a set of product types: deriving a stock condition of a slot in an inventory structure, in the set of inventory structures, associated with the product type based on features extracted from a subset of images, depicting the slot, in the feed of images in Block S122; and, in response to the stock condition deviating from a target stock condition defined for the product type, inserting the product type into a re-stock list including a set of re-stock product types in Block S160, and generating a product flag, in a set of product flags, for the product type and corresponding to a back-of-store inventory region associated with stock of the product type in Block S170. In this variation, the method S100 further includes: accessing a first location of a mobile device, within the store, accessed by a user associated with the store in Block S172; and, in response to the first location falling within a threshold distance of a first product flag, in the set of product flags, corresponding to a first product type in the set of re-stock product types, generating a re-stock notification including a prompt to deliver a first quantity of product units of the first product type from the back-of-store inventory region to a first slot in a first inventory structure, in the set of inventory structures, in the customer region of the store, the first slot assigned to the first product type in Block S150, and transmitting the re-stock notification to the user via the mobile device in Block S152.

In one variation, the method S100 further includes deploying a mobile robotic system to autonomously navigate throughout the customer region of the store during a first scan cycle, the mobile robotic system including an optical sensor in Block S180.

2. Applications

Generally, a computer system (e.g., a computer server, a computer network) can execute Blocks of the method S100 to: track stock conditions in customer-product facing (or "front-of-store") inventory structures located in a customer region of the store; dynamically update a re-stocking list based on predicted stock conditions—predicted based on images of these inventory structures and point-of-sale data—of product types in slots on these inventory structures; and selectively prompt a store associate to re-stock slots in front-of-store inventory structures—with product units stored in back-of-store inventory structures located in a back-of-store region of the store—based on a location of the store associate relative back-of-store inventory structures and a priority level or "urgency" associated with re-stocking of each product type sold at the store.

More specifically, the computer system can: derive and track stock conditions (e.g., a stocked condition, a low-stock condition, and/or an out-of-stock condition) at a particular individual customer-product facing slot—associated with a particular product type—in the store over time based on photographic images captured by fixed cameras and/or a mobile robotic system deployed in the store and point-of-sale data for this particular product type; receive an indication that a store associate is located proximal and/or travelling toward stock of this product type in a back-of-store inventory region of the store (e.g., inaccessible to customers of the store); and selectively generate a re-stock notification—such as including a quantity of product units of the product type and/or a pathway from the back-of-store inventory region to the slot in the customer region of the store associated with the particular product type—for this particular product type based on the current predicted stock condition of the product type in the slot; and transmit the re-stock notification to the store associate, such that the store associate may deliver product units of the product type from the back-of-store inventory region to the slot. The computer system can therefore selectively prompt the store associate to re-stock product units of a product type in the customer region of the store: if the predicted stock condition of the product type in the customer region deviates from a target stock condition, such as falling below a target quantity of product units; and while the store associate is already near and/or approaching stock of this product type in the back-of-store inventory region of the store.

2.1 Applications: "User-Initiated Scan of Back-of-Store Inventory"

In one example, the store associate may scan a product unit, of a particular product type, stored in a back-of-store inventory region of the store. Responsive to receipt of this scan (or "image") from a mobile device (e.g., a tablet, a smartphone) of the store associate, the computer system can: identify the product type represented in the image based on features extracted from the image; access a set of point-of-sale data corresponding to the product type and captured in a preceding time period; access a most-recent image depicting a slot, in an inventory structure in the customer region of the store, associated with the product type; and, based on the set of point-of-sale data and features extracted from this most-recent image, derive a predicted quantity of product units of the particular product type remaining in the slot in the inventory structure in the customer region of the store. The computer system can then: access a target quantity of product units defined for the particular product type in the slot; characterize a difference between the predicted quantity and the target quantity of product units of the particular type; and generate a re-stock notification including a prompt to re-stock the slot—in the customer region of the store—with a second quantity of product units, from the back-of-store inventory region, estimated based on the difference.

Furthermore, in this example, the computer system can: access a first location associated with the image captured by the store associate (and therefore corresponding to a user location of the store associate and stock of the particular product type in the back-of-store inventory region); access a second location of the slot in the inventory structure in the customer region of the store; access a map of the store depicting the customer region and the back-of-store inventory region; and, based on the map, derive a pathway between the first location and the second location for the store associate. The computer system can thus append the re-stock notification with this pathway for the store associate to re-stock the slot in the customer region of the store with the second quantity of product units removed from the back-of-store inventory region.

The computer system can thus: receive an indication—initiated by the store associate via capturing of the image of a product unit and/or shelf tag—that the store associate is located proximal product units of a particular product type in a back-of-store inventory region of the store; and, in response to receipt of this indication, automatically verify whether additional stock of this product type is required in a corresponding slot in an inventory structure in the customer region of the store, such as while the store associate is already located proximal product units of the product type in the back-of-store inventory region.

2.2 Applications: "Dynamic Re-Stock List"

In another example, the computer system can automatically prompt the store associate to re-stock product units of a particular product type with stock from the back-of-store inventory region based on a current location of the store associate within the store and the dynamically-updated re-stock list.

In particular, in this example, the computer system can: access a stream of images captured by the mobile robotic system during scan cycles; access point-of-sale data captured for each product type, in a set of product types, sold by the store; and, for each product type, in the set of product types, derive a predicted stock condition for the product type based on point-of-sale data collected for this product type and features extracted from an image or images representing a slot—in an inventory structure in the customer region of the store—assigned to this product type. The computer system can then assign an urgency score—such as based on sell-through, sales velocity, whether a product type is a high-margin product type, which product types are most frequently out of stock, etc.—to each product type, in the set of product types, for re-stocking products of the product type in a slot assigned to the product type in the customer region of the store. The computer system can then: identify a subset of product types, in the set of product types, exhibiting urgency scores higher than other product types in the set of product types; and update the re-stock list to include this subset of product types.

Then, in response to adding a product type to the re-stock list, the computer system can: access a map defined for the store and including the customer region and the back-of-store inventory region of the store; access an inventory location corresponding to stock of the product type in the back-of-store region of the store; and generate a flag (e.g., a geospatial flag) at this inventory location within the map. The computer system can repeat this process for each other product type included in the re-stock list in order to generate a set of flags corresponding to the subset of product types selectively flagged for re-stocking by the store associate.

Furthermore, the computer system can track a location of a store associate traversing throughout the store, such as based on detection of the store associate's mobile device (e.g., a tablet, a smartphone) within the store. Then, when the user location of the store associate falls within a threshold distance of one or more flags on the map, the computer system can prompt the store associate to re-stock the product type(s) in the customer region of the store with stock collected from the back-of-store inventory region (e.g., via a re-stock notification).

3. Hierarchy & Terms

A "store" is referred to herein as a (static or mobile) facility containing one or more inventory structures.

A "product" is referred to herein as a type of loose or packaged good associated with a particular product identifier (e.g., a SKU) and representing a particular class, type, and varietal. A "unit" or "product unit" is referred to herein as an instance of a product—such as one bottle of detergent, one box of cereal, or package of bottled water—associated with one SKU value.

A "product facing" is referred to herein as a side of a product designated for a slot.

A "slot" is referred to herein as a section (or a "bin") of a shelf on an "inventory structure" designated for storing and displaying product units of the product type (i.e., of the same SKU or CPU). An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. In particular, the planogram can specify a target product type, a target product placement, a target product quantity, a target product quality (e.g., ripeness, time to peak ripeness, maximum bruising), and/or a target product orientation for a fully-stocked slot for each slot represented in the planogram. For example, the planogram can define a graphical representation of an inventory structure in the store, including graphical representations of each slot in this inventory structure, each populated with a quantity of graphical representations of product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the mobile robotic system while autonomously executing scan cycles in the store.

The method S100 is described herein as executed by a computer system (e.g., a remote server, a computer network) remote from the mobile robotic system. However, Blocks of the method S100 can be executed locally by one or more robotic systems deployed in a retail space (or store, warehouse, etc.), by a local computer system (e.g., a local server), or by any other computer system.

Furthermore, Blocks of the method S100 are described below as executed by the computer system to identify products, to identify electronic shelf labels, and to verify product data displayed on these electronic shelf labels on open shelves in shelving structures within a grocery store. However, the computer system can implement similar methods and techniques to identify products, to identify electronic shelf labels, and to verify product data displayed on these electronic shelf labels on cubbies, in a refrigeration unit, on a wall rack, on a freestanding floor rack, on a table, on a hot-food display, or on or in any other product organizer, display, or other inventory structure in a retail space.

4. Robotic System

As shown in FIG. 3, a mobile robotic system autonomously navigates throughout a store and records images—such as photographic images of packaged goods and/or depth images of inventory structures—continuously or at discrete predefined waypoints throughout the store during a scan cycle. Generally, the mobile robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

In one implementation, the mobile robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the mobile robotic system; a mast extending vertically from the base; a set of photographic cameras arranged on the mast; and a wireless communication module that downloads waypoints and a master map of a store from a computer system (e.g., a remote server) and that uploads photographic images captured by the photographic camera and maps generated by the processor to the computer system. In this implementation, the mobile robotic system can include photographic cameras mounted statically to the mast, such as a first vertical array of (e.g., two, six) photographic cameras on a left side of the mast and a second vertical array of photographic cameras on the right side of the mast. The mobile robotic system can additionally or alternatively include articulable photographic cameras, such as: one photographic camera on the left side of the mast and supported by a first vertical scanning actuator; and one photographic camera on the right side of the mast and supported by a second vertical scanning actuator. The mobile robotic system can also include a zoom lens, a wide-angle lens, or any other type of lens on each photographic camera. However, the mobile robotic system can define any other form and can include any other subsystems or elements supporting autonomous navigating and image capture throughout a store environment.

Furthermore, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic and/or depth images captured by these robotic systems deployed in this store to generate a graph, map, table, and/or task list for managing distribution and re-stocking of product throughout the store.

5. Scan Cycle+Stock Conditions

Block S180 of the method S100 recites: deploying the mobile robotic system—including an optical sensor (e.g., as described above)—to autonomously navigate throughout the customer region of the store during a scan cycle.

In particular, the computer system dispatches the mobile robotic system: to autonomously navigate throughout regions of the store, such as both a customer region (or "front") of the store and a back-of-store inventory region (or "back") of the store; and to image inventory structures in the front and back of the store.

For example, inventory structures in the front of the store can include: store shelves; aisle end caps; produce bins; and other structures from which a patron can select a product type. Inventory structures located in the front of the store can also include "top-shelf" inventory locations, such as non-customer-product facing shelves located overhead customer-product facing slots and configured to store excess and loose product units not returned to the back of the store after re-stocking of the customer-product facing slots below. Inventory structures in the back of the store can include structures or areas designated to hold product delivered to the store—such as stored in boxed formats—before these product units are transferred to the front of the store during later re-stocking periods. For example, back-of-store inventory structures can include shelving, bins, floor spaces, and receiving areas.

In one implementation, during a scan cycle, the mobile robotic system can: autonomously navigate to an inventory structure in the front of the store; record an image of the customer-product facing inventory structure via an optical sensor integrated in the mobile robotic system; upload the image to a database; and repeat this process to image each other customer-product facing inventory structure in the front of the store during the scan cycle.

Additionally or alternatively, in one implementation, the mobile robotic system can: autonomously navigate to an inventory structure in the front of the store; record a sequence of photographic images of the customer-product facing inventory structure via the optical sensor while traversing an aisle in the store facing the first inventory structure; and upload the sequence of images to a database. The computer system can then: access the sequence of photographic images captured by the optical sensor in the robotic system during the first scan cycle; and compile the sequence of photographic images into an image (e.g., a singular image) defining a first composite photographic image depicting a set of shelving segments spanning the inventory structure.

The computer system can then retrieve a first image captured by the remote computer system during this scan cycle and implement computer vision techniques described below and in U.S. patent application Ser. No. 15/600,527, filed on 19 May 2017, which is incorporated in its entirety by this reference: to detect regions of the image depicting individual slots (e.g., based on positions of shelf tags detected in the image, based on positions of product units detected in the image, or based on slot location defined in a planogram); to retrieve template visual features of known product types assigned to these slots (e.g., according to shelf tags or the planogram); to extract features from these regions of the image; to detect and identify product units in these slots based on congruence of features extracted from corresponding regions of the image and template visual features representing these known product types; and to compile locations and product types of these product units into stock conditions of each slot detected in the image.

More specifically, the computer system can identify each slot as fully-stocked, understocked, out-of-stock (or derive a stock rate between 0% and 100%) based on quantities of product units—detected in the corresponding region of the image—that match template visual features of a particular product type assigned to the slot by a corresponding shelf tag detected in the image and/or by the planogram. The computer system can then repeat this process for each other image captured during the scan cycle and aggregate stock conditions of slots—depicted in these images—into a realogram representing stock distribution in customer-product facing inventory structures throughout the store during the scan cycle.

For example, the computer system can: deploy the mobile robotic system to autonomously navigate throughout the customer region of the store during a scan cycle to capture images of inventory structures in the customer region of the store. Then, during and/or after the scan cycle, the computer system can: access a first image, depicting a first inventory structure in the customer region of a store, captured at a first time; detect a first slot, in the first inventory structure, in a first region of the first image; extract a first set of features from the first region of the first image; detect a first set of product units of a first product type occupying the first slot at the first time based on the first set of features, the first product type assigned to the first slot; and derive a first stock condition of the first slot at the first time based on the first set of product units. The computer system can then repeat this process to derive a stock condition for each product type in a set of product types sold at the store.

In particular, in this example, the computer system can: derive an out-of-stock condition for the first product type in the first slot in response to detecting absence of product units of the first product type in the first slot; derive an under-stocked condition (or "low-stock condition") for the first product type in the first slot in response to detecting less than a target quantity of units of the first product type in the first slot; and/or derive a fully-stocked condition for the first product type in the first slot in response to detecting the target quantity of units of the first product type in the first slot. The computer system can then repeat this process—by deploying the mobile robotic system to autonomously navigate throughout the customer region of the store during the scan cycle—to: access an image or images of each inventory structure, in a set of inventory structures, in the customer region of the store; derive stock conditions of product units of various product types in slots across the set of inventory structures based on the image or images of these inventory structures; and assemble a realogram—representing stock distribution in the set of inventory structures throughout the store during the scan cycle—based on the derived stock conditions.

6. Back-of-Store Scan Event

Block S110 of the method S100 recites: receiving a first image including visual data from a mobile device accessed by a user associated with a store, the first image associated with a first location in a back-of-store inventory region of the store. Furthermore, Block S112 of the method S100 recites: based on features extracted from the first image, identifying a first product type, in a set of product types associated with the store, represented in the first image.

Generally, as shown in FIGS. 1A and 1B, the computer system can: receive a "back-of-store" image—captured via a mobile device (e.g., a smartphone, a tablet) accessed by a store associate—including visual data representing a product type of one or more product units proximal the store associate in the back-of-store inventory region of the store. For example, the computer system can receive the image via a native stocking application executing on a smartphone or tablet carried by the store associate.

In one implementation, the computer system can receive a back-of-store image depicting a first product unit of the first product type and captured by the mobile device. For example, the user may: capture a photographic image of the first product unit of the first product type—stored in a particular location associated with stock of the first product type and in the back-of-store inventory region of the store—via her smartphone or tablet; and upload this photographic image to the computer system via the native stocking application. The computer system can then: access template images defined for product types associated with the store; and, based on one or more template images and visual features extracted from the photographic image of the first product unit, identify the first product type corresponding to the first product unit depicted in the photographic image.

Additionally or alternatively, in another implementation, the computer system can: receive a back-of-store image depicting an identifier (e.g., a SKU)—such as affixed to the first product unit and/or printed on a shelf tag corresponding to stock of the first product type in the back-of-store inventory region of the store—and captured by the mobile device; and identify the first product type corresponding to the identifier depicted in the image.

The computer system can thus: receive an indication—initiated by the store associate via capturing of the image of a product unit and/or shelf tag—that the store associate is located proximal product units of a particular product type in a back-of-store inventory region of the store; and, in response to receipt of this indication, automatically verify whether additional stock of this product type is required in a corresponding slot in an inventory structure in the customer region of the store, such as while the store associate is already located proximal product units of the product type in the back-of-store inventory region.

6.1 Predicted Stock Condition for Product Type

Block S120 and Block S130 of the method S100 recite: accessing a second image of a first slot in a first inventory structure in a customer region of the store, the first slot assigned to the first product type, the second image captured at a second time preceding the first time (e.g., at which the user uploaded the first image to the computer system); and accessing a set of point-of-sale data associated with the first product type and corresponding to a first time period preceding the first time.

Furthermore, Block S140 of the method S100 recites: predicting a first quantity of product units of the first product type loaded in the first slot at the first time based on the set of point-of-sale data and the first stock condition.

In one implementation, the computer system can: receive a "back-of-store" image from the store associate (e.g., via the mobile device accessed by the store associate) at a first time; identify a product type, in a set of product types, represented in the back-of-store image; identify a particular slot—within an inventory structure in the customer region of the store—assigned to the product type; and access a "front-of-store" image—captured by the mobile robotic system at a second time (e.g., during a scan cycle) preceding the first time—depicting the particular slot. The computer system can then derive a stock condition—such as fully-stocked, understocked, out-of-stock, and/or a particular quantity of product units remaining—for the product type in this slot at the second time based on features extracted from the front-of-store image.

Furthermore, the computer system can then: retrieve a set of point-of-sale data corresponding to sales of product units of the product type during a time period between the second time and the first time; and leverage this point-of-sale data—in combination with the stock condition at the second time—to derive a predicted quantity of product units of the product type in the slot, in the inventory structure in the customer region of the store, at the first time (e.g., at which the user uploaded the back-of-store image to the computer system).

For example, the computer system can: receive a first image—depicting a first product unit of a first product type stored in a back-of-store inventory region of the store—captured at a first time by a mobile device accessed by a store associate; identify the first product type represented in the first image based on features in the first image and a set of template images corresponding to the first product type and stored in a template image database; access a second image—depicting a first inventory structure in a customer region of the store—captured by the mobile robotic system and/or a store associate at a second time preceding the first time, the first inventory structure including a first slot assigned to product units of the first product type; detect a first set of product units of the first product type in the first slot at the second time based on features represented in the second image; and derive a first stock condition—such as characterized by a quantity of product units present in the first slot and/or by a descriptor (e.g., "fully-stocked," "under-stocked," and/or "out-of-stock")—for the first product type in the first slot at the second time based on detection of the first set of product units of the first product type.

The computer system can then: access a first set of point-of-sale data recorded for the first product type during a sampling period preceding the first time—corresponding to capturing of the first image in the back-of-store inventory region of the store—and/or succeeding the second time, the first set of point-of-sale data representing sales of product units of the first product type during the sampling period; and, based on the first stock condition predicted for the first slot at the second time and the first set of point-of-sale data captured during the sampling period, predict a first quantity of product units of the first product type present in the first slot—in the first inventory structure in the customer region of the store—at the first time.

Additionally or alternatively, in one variation, the computer system can leverage a shrink rate—representing loss of product outside of sales (e.g., due to theft)—defined for a product type to more accurately predict a quantity of product units of the product type remaining in a slot, assigned to the product type, in an inventory structure in the customer region of the store.

In particular, in the preceding example, the computer system can: derive the first stock condition for the first product type in the first slot at the second time based on detection of the first set of product units of the first product type; access the first set of point-of-sale data recorded for the first product type during the sampling period; access a first shrink rate defined for product units of the first product type stored in the first slot in the first inventory structure; and, based on the first stock condition, the first set of point-of-sale data, and the first shrink rate, predict a second quantity of product units of the first product type present in the first slot—in the first inventory structure in the customer region of the store—at the first time.

In one implementation, the computer system can access a shrink rate defined for a product type and for a particular sales period (e.g., a particular time of day). For example, the computer system can: access a first shrink rate defined for a first product type during a first time period in the morning; and access a second shrink rate defined for the first product type during a second time period in the afternoon.

6.1.1 Confidence in Predicted Stock Condition

In one variation, the computer system can derive a confidence score representing confidence in the predicted quantity of product units of a particular product type remaining in a slot in an inventory structure in the customer region of the store. The computer system can then report this confidence score to the store associate and/or leverage the confidence score to selectively suggest re-stocking of product units of the product type in the customer region of the store.

In one implementation, the computer system can derive a confidence score for a particular product type based on a duration between an initial time corresponding to capture of an image of the inventory structure containing the slot and a later time corresponding to capture of an image by the store associate in the back-of-store inventory region of the store. For example, the computer system can: at a first time, receive a first image captured by a mobile device accessed by a store associate, the first image associated with a first location in a back-of-store inventory region of the store; identify a first product type represented in the first image based on features in the first image; access a second image—captured by the mobile robotic system at a second time preceding the first time—depicting a first inventory structure containing a first slot assigned to the first product type in the customer region of the store; and access a set of point-of-sale data for the first product type during a sales period preceding the first time. The computer system can then: estimate a duration between the first time and the second time; and, based on the duration, characterize a confidence score in the first quantity of product units predicted for the first product type.

For example, in response to estimating a duration of twenty minutes between the first time and the second time, the computer system can derive a confidence score of 90 percent. In another example, in response to estimating a duration of four hours between the first time and the second time, the computer system can derive a confidence score of 50 percent.

Therefore, the computer system can derive a relatively higher confidence score when the duration is relatively low and derive a relatively lower confidence score when the duration is relatively high.

6.2 Re-Stock Notification

Block S150 and Block S152 of the method S100 recite, in response to the first quantity of product units falling below a threshold quantity: generating a re-stock notification including a second quantity of product units of the first product type and a prompt to deliver the second quantity of product units from the back-of-store inventory structure to the first slot in the first inventory structure in the customer region of the store; and transmitting the re-stock notification to the user via the mobile device accessed by the user.

Generally, the computer system can generate a re-stock notification indicating a predicted low-stock condition or out-of-stock condition in a particular slot—in the inventory structure in the customer region of the store—corresponding to the product type scanned by the store associate in the back-of-store inventory region of the store. The computer system can then transmit this re-stock notification to the store associate—such as via the native application executing on the store associate's mobile device—to prompt the store associate to transfer stock of the product type from the back-of-store inventory region to the customer region of the store.

Furthermore, the computer system can prompt the store associate to transfer a particular quantity of product units of the product type from this back-of-store inventory region to the customer region of the store. In particular, the computer system can: implement the methods and techniques described above to predict a first quantity of product units of the product type remaining in the slot in the inventory structure in the customer region of the store; access a threshold quantity (or "target quantity") of product units defined for this particular product type and/or slot; in response to the first quantity of product units falling below the threshold quantity defined for this particular product type and/or slot, generate a prompt to transfer a second quantity of product units—corresponding to a difference between the threshold quantity and the first quantity—from the back-of-store inventory region to the slot in the customer region of the store; populate a re-stock notification with the prompt; and transmit the prompt to the store associate (e.g., via the store associate's mobile device).

Additionally, in one implementation, the computer system can populate the re-stock notification with a confidence score representing confidence in the predicted quantity of product units remaining in the corresponding slot in the customer region of the store. For example, the computer system can: implement the methods and techniques described above to predict a first quantity of product units of the product type loaded in the slot and derive a confidence score representing confidence in the first quantity of product units; generate a re-stock notification including a second quantity of product units of the product type and a prompt to deliver the second quantity of product units from the back-of-store inventory structure to the slot in the customer region of the store; populate the re-stock notification with the confidence score; and transmit the re-stock notification to the user (e.g., via the mobile device).

Additionally or alternatively, in one implementation, as further described below, the computer system can populate the re-stock notification with a particular pathway from the back-of-store inventory structure—containing stock of the product type and corresponding to a location of the store associate—to the particular slot, in the inventory structure in the customer region of the store, corresponding to the product type. The computer system can thus provide the store associate with a pathway throughout the store—from the back-of-store inventory structure to the particular slot in the customer region of the store—for re-stocking product units of the product type in the particular slot.

Additionally or alternatively, in another implementation, as described further below, the computer system can populate the re-stock notification with an urgency score representing a priority level for re-stocking a particular product type. In this implementation, the computer system can thus delineate between high-priority and low-priority product types and promote re-stocking of product types with relatively higher urgency scores prior to re-stocking of product types with relatively lower urgency scores.

Additionally, in one implementation, the computer system can populate the re-stock notification with the most-recent image—captured by the mobile robotic system and leveraged to predict the quantity of product units remaining in the customer region of the store—of the slot in the inventory structure in the customer region of the store. In this implementation, the computer system can thus provide visual confirmation to the store associate of a (relatively) low stock condition and/or out-of-stock condition at the slot in the customer region of the store.

6.3 High-Priority Action Vs Low-Priority Action

In one variation, Block S154 recites characterizing an urgency score for the first product type based on the first quantity of product units in the first slot at the first time. In this variation, Block S150 recites generating the re-stock notification including the second quantity of product units, the prompt to deliver the second quantity of product units, and the urgency score.

In this variation, the computer system can populate the re-stock notification with an urgency score representing a priority level for re-stocking a particular product type, thereby promoting re-stocking of product types with relatively higher urgency scores prior to re-stocking of product types with relatively lower urgency scores.

In one implementation, the computer system can leverage a sales velocity defined for a particular product type—in combination with a predicted quantity of product units of the product type remaining in a slot in the customer region of the store—to derive an urgency score for re-stocking product units of the product type in the customer region of the store.

For example, in this implementation, the computer system can: implement the methods and techniques described above to derive a predicted quantity of product units of a product type remaining in a slot in an inventory structure in the customer region of the store based on features extracted from one or more images of the slot (e.g., captured by the mobile robotic system during a scan cycle) and point-of-sale data captured for the product type; derive a sales velocity for the product type based on point-of-sale data captured for the product type; and, based on the predicted quantity of product units and the sales velocity, characterize an urgency score—such as represented by a percentage, a numerical value between one and ten, a non-numerical score (e.g., "high urgency," "low urgency"), etc.—for the product type. In particular, in one example, the computer system can: predict a future time at which the slot assigned to the product type will be empty or exhibit an out-of-stock condition based on the sales velocity and the predicted quantity of product units currently in the slot; and derive the urgency score based on a duration between a current time and the future time.

Additionally or alternatively, in another implementation, the computer system can: leverage a confidence score derived for the product type (e.g., as described above)—in combination with a predicted quantity of product units of the product type remaining in a slot in the customer region of the store—to derive an urgency score for re-stocking product units of the product type in the customer region of the store. For example, in this implementation, in response to deriving a relatively-high confidence score in a predicted quantity of product units remaining in the slot, the computer system can derive a relatively-high urgency score for re-stocking product units of the product type. Furthermore, in this example, in response to deriving a relatively-low confidence score in the predicted quantity of product units remaining in the slot, the computer system can derive a relatively-low urgency score for re-stocking product units of the product type.

Based on the urgency score, the computer system can selectively prompt the store associate to re-stock product units of product types exhibiting higher urgency scores before re-stocking product units of product types exhibiting lower urgency scores.

6.4 Re-Stock Pathway

In one implementation, the computer system can populate the re-stock notification with a particular pathway (or "re-stock pathway") from the back-of-store inventory structure—containing stock of the product type and corresponding to a location of the store associate—to the particular slot, in the inventory structure in the customer region of the store, corresponding to the product type. The computer system can thus provide the store associate with a pathway throughout the store—from the back-of-store inventory structure to the particular slot in the customer region of the store—for re-stocking product units of the product type in the particular slot.

In particular, in this implementation, the computer system can: access a first location of back-of-store inventory of a product type—represented in the image captured by the store associate—in the back-of-store inventory region of the store; access a map of the store including the back-of-store inventory region and the customer region; access a second location of the corresponding slot—assigned to the product type—in the inventory structure in the customer region of the store; and, based on the map, derive a re-stock pathway between the first location in the back-of-store inventory region and the second location of the slot in the customer region of the store. The computer system can then: generate a re-stock notification including a prompt to deliver a particular quantity of product units—from the back-of-store inventory structure at the first location to the slot at the second location in the inventory structure in the customer region of the store—according to the re-stock pathway; and transmit this prompt to the store associate (e.g., while the store associate is located at the first location.)

7. Dynamically Updated "Re-Stock List"

In one variation, the computer system can automatically maintain and/or dynamically update a re-stock list including a list of product types—and corresponding slots in inventory structures in the customer region of the store—that require re-stocking by a store associate. In this variation, the computer system can leverage images captured by the mobile robotic system—traversing aisles of the customer region of the store—in combination with point-of-sale data to predict quantities of product units of various product types in slots on inventory structures in the customer region of the store and selectively update the re-stock list based on these predicted quantities.

In particular, in this variation, Blocks of the method S100 recite accessing a feed of images, depicting a set of inventory structures in a customer region of a store, captured during a scan cycle. Blocks of the method S100 further recite, for each product type in a set of product types:

deriving a stock condition of a slot in an inventory structure, in the set of inventory structures, associated with the product type based on features extracted from a subset of images, depicting the slot, in the feed of images; and, in response to the stock condition deviating from a target stock condition defined for the product type, inserting the product type into a re-stock list including a set of re-stock product types.

For example, the computer system can: access a first image (e.g., a panoramic or "composite" image) depicting a first inventory structure in the customer region of the store; derive a first stock condition of a first slot in the first inventory structure associated with a first product type based on features extracted from the first image; access a first target stock condition (e.g., a target quantity of product units) defined for the first product type; and, in response to the first stock condition deviating from the first target stock condition, insert the first product type into a re-stock list. The computer system can also append the re-stock list with a predicted quantity of product units remaining in the first slot and/or with a re-stock quantity of product units for re-stocking the first slot. The computer system can also: derive a second stock condition of a second slot in the first inventory structure associated with a second product type based on features extracted from the first image; access a second target stock condition defined for the second product type; and, in response to the second stock condition corresponding to the second target stock condition, reject the second product type for inclusion in the re-stock list.

Furthermore, the computer system can: access a second image (e.g., a panoramic or "composite" image) depicting a second inventory structure in the customer region of the store; derive a third stock condition of a third slot in the second inventory structure associated with a third product type based on features extracted from the second image; access a third target stock condition defined for the third product type; and, in response to the third stock condition deviating from the third target stock condition, insert the third product type into the re-stock list. The computer system can therefore repeat this process for each slot in each inventory structure, in a set of inventory structures, in the customer region of the store and thus generate a re-stock list accordingly. The computer system can update these predicted quantities of product units remaining in each slot each time the mobile robotic system captures and uploads a new image(s) of the inventory structure(s) to the computer system.

Furthermore, the computer system can leverage point-of-sale data in combination with images captured by the mobile robotic system to dynamically update this re-stock list based on sales of product types and, therefore, predicted decreases in stock of these product types over time, such as between scan cycles by the mobile robotic system.

For example, the mobile robotic system can capture a sequence of images of an inventory structure in the customer region of the store at a first time. At approximately the first time, the computer system can: identify a first slot—assigned to a first product type—in the inventory structure and represented in the sequence of images; predict a first quantity of product units of the first product type present in the first slot at the first time based on features in the sequence of images; and, based on the first quantity of product units, selectively withhold the first product type from the re-stock list. Then, at a second time succeeding the first time, the computer system can: access a timeseries of point-of-sale data corresponding to sales of the first product type between the first time and the second time; and predict a second quantity of product units of the first type present in the first slot at the second time based on the first quantity of product units—predicted at the first time—and the timeseries of point-of-sale data. Then, in response to the second quantity of product units falling below a target quantity of product units defined for the first product type in the first slot, the computer system can update the re-stock list—at the second time—to include the first product type in the first slot. The computer system can, therefore, continuously update the re-stock list as additional images are captured by the mobile robotic system and as additional point-of-sale data is available.

7.1 Re-Stock List: Priority

In one implementation, the computer system can selectively append the re-stock list with product types based on a priority or "urgency" assigned to each of these product types.

For example, the computer system can implement the methods and techniques described above to: predict a current stock condition for each product type, in a set of product types, sold in the store; and assign an urgency score—such as based on sell-though, sales velocity, whether a product type is a high-margin product type, which product types are most frequently out of stock, etc.—to each product type, in the set of product types, for re-filling products of the product type in a slot assigned to the product type in the customer region of the store. The computer system can then: identify a subset of product types, in the set of product types, exhibiting urgency scores higher than other product types in the set of product types; and update the re-stock list to include this subset of product types.

For example, the computer system can: predict a current stock condition for each SKU in a set of 1000 SKUs defined for the store; based on the predicted current stock conditions and sales data available for each of these SKUs, assign an urgency score to each SKU in the set of 1000 SKUs; identify a set of 10 SKUs exhibiting the highest urgency scores in the set of 1000 SKUs; and update the re-stock list to include this set of 10 SKUs. Additionally or alternatively, in another example, the computer system can add a product type to the re-stock list in response to the urgency score, associated with re-stocking units of the product type, exceeding a threshold urgency.

Rather than include all product types exhibiting any deviation from a target stock condition on the re-stock list, the computer system can, therefore, prioritize re-stocking of product types exhibiting higher urgency and allocate resources accordingly.

7.2 Location Tracking: Store Associate+Back-of-Store Inventory

The computer system can also track a location of a store associate within the store, including within the customer region and the back-of-store inventory region of the store. Then, based on the location of the store associate within the computer system, the computer system can selectively transmit re-stock notifications to the store associate responsive to the store associate approaching and/or locating within a threshold distance of back-of-store inventory of a product type included in the re-stock list.

The computer system can therefore: implement the methods and techniques described above to maintain and dynamically update the re-stock list; access back-of-store inventory locations—such as within back-of-store inventory structures—defined for product types sold in the store; track a location of a store associate walking throughout the store; and, in response to the location of the store associate falling within a threshold distance of a back-of-store inventory location associated with stock of a product type included in the re-stock list, generate a re-stock notification specifying the product type—and/or a quantity of product units of the product type—for re-stocking in the customer region of the store. The computer system can then transmit this re-stock notification to the store associate while the store associate is located proximal this back-of-store inventory location.

For example, the computer system can: generate a re-stock list including a first product type assigned to a first slot in a first inventory structure—associated with a first location—in the customer region of the store; access a second location—associated with stock of the first product type—in a back-of-store inventory region of the store; track a user location of a store associate working in the store; and, in response to the user location falling within a threshold distance of the second location in the back-of-store inventory region of the store, automatically generate a re-stock notification including a prompt to re-stock product units of the first product type in the first slot with product units of the first product type stored at the second location interface heating element back-of-store inventory region. The computer system can then transmit this re-stock notification to the store associate in (near) real-time as the store associate approaches this second location.

In one implementation, in response to adding a product type to the re-stock list, the computer system can: access a map defined for the store and including the customer region and the back-of-store inventory region of the store; access an inventory location corresponding to stock of the product type in the back-of-store region of the store; and generate a flag (e.g., a geospatial flag) at this inventory location within the map. The computer system can repeat this process for each other product type included in the re-stock list in order to generate a set of flags corresponding to a set of re-stock product types selectively flagged for re-stocking by the store associate. Then, when the user location of the store associate falls within a threshold distance of one or more flags on the map, the computer system can prompt the store associate to re-stock the product type(s) in the customer region of the store with stock collected from the back-of-store inventory region (e.g., via a re-stock notification).

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   during a scan cycle, by a mobile robotic system, autonomously navigating throughout a customer region of a store to capture images of inventory structures, arranged within the customer region, via an optical sensor; and
   by a computer system:
      at a first time, receiving a first image comprising visual data captured by a mobile device accessed by a user associated with a store, the first image associated with a first location in a back-of-store inventory region of the store;
      based on features extracted from the first image, identifying a first product type, in a set of product types, represented in the first image;
      accessing a second image of a first slot in a first inventory structure in the customer region of the store, the first slot assigned to the first product type, the second image captured at a second time preceding the first time by the mobile robotic system during the scan cycle;
      based on features extracted from the second image, estimating a first stock condition for the first product type in the first slot at the second time;
      accessing a first set of point-of-sale data associated with the first product type and corresponding to a first time period preceding the first time and succeeding the second time;
      predicting a first quantity of product units of the first product type loaded in the first slot at the first time based on the first set of point-of-sale data and the first stock condition at the second time; and
      in response to the first quantity of product units falling below a threshold quantity:
         generating a re-stock notification comprising a second quantity of product units of the first product type and a prompt to deliver the second quantity of product units from the back-of-store inventory structure to the first slot in the first inventory structure in the customer region of the store; and
         transmitting the re-stock notification to the user via the mobile device.

2. The method of claim 1:
   wherein accessing the second image comprises:
      accessing a sequence of photographic images captured by the optical sensor in the mobile robotic system during the scan cycle while traversing an aisle in the store product facing the first inventory structure; and
      compiling the sequence of photographic images into the second image defining a composite photographic image depicting a first set of shelving segments spanning the first inventory structure.

3. The method of claim 1:
   further comprising, in response to the first quantity of products of the first product type exceeding the threshold quantity:
      generating an in-stock notification indicating the first quantity of products exceeds the threshold quantity; and
      transmitting the in-stock notification to the user via the mobile device.

4. The method of claim 1:

wherein accessing the stock condition comprises:

detecting the first slot, in the first inventory structure, in a first region of the first image;

extracting a first set of features from the first region of the first image;

detecting a first set of product units of the first product type occupying the first slot at the second time based on the first set of features; and deriving the first stock condition of the first slot at the first time based on the first set of product units.

5. The method of claim 1:

further comprising:

deriving a sales velocity for the first product type based on the first set of point-of-sale data; and based on the first quantity of product units in the first slot at the first time and the sales velocity, characterizing an urgency score for the first product type; and wherein generating the re-stock notification comprises generating the re-stock notification comprising the second quantity of product units, the prompt to deliver the second quantity of product units, and the urgency score.

6. The method of claim 1:

further comprising:

estimating a duration between the first time and the second time;

accessing a shrink rate defined for the first product type; and based on the duration and the shrink rate, characterizing a confidence score in the first quantity of products predicted for the first product type; and wherein generating the re-stock notification comprises generating the re-stock notification comprising the second quantity of product units, the prompt to deliver the second quantity of product units, and the confidence score.

7. The method of claim 6:

further comprising, based on the confidence score and the first product type, characterizing an urgency score for re-stocking product units of the first product type in the first slot; and wherein generating the re-stock notification comprises generating the re-stock notification comprising the second quantity of product units, the prompt to deliver the second quantity of product units, the confidence score, and the urgency score.

8. The method of claim 1, further comprising:

accessing a target quantity of product units of the first product type defined for the first slot;

characterizing a difference between the target quantity and the first quantity of product units; and estimating the second quantity of product units based on the difference.

9. The method of claim 1:

further comprising:

accessing a location of a first set of product units of the first product type in the back-of-store inventory structure;

accessing a map of the store comprising the back-of-store inventory region and the customer region;

accessing a second location of the first slot in the first inventory structure; and based on the map, deriving a first pathway between the first location in the back-of-store inventory region and the second location of the first slot in the customer region of the store; and wherein generating the re-stock notification comprising the prompt to deliver the second quantity of product units from the back-of-store inventory structure to the first slot in the first inventory structure in the customer region of the store comprises generating the re-stock notification comprising the prompt to deliver the second quantity of product units from the back-of-store inventory structure to the first slot in the first inventory structure in the customer region of the store according to the first pathway.

10. The method of claim 1, wherein receiving the first image captured by the mobile device comprises receiving the first image, depicting a first product unit of the first product type, captured by the mobile device.

11. The method of claim 1, wherein receiving the first image comprising visual data comprises receiving the first image comprising visual data comprising a SKU represented in a shelf tag at the first location in the back-of-store inventory region, the SKU corresponding to the first product type.

12. A method comprising:

during a scan cycle, by a mobile robotic system, autonomously navigating throughout a customer region of a store to capture images of inventory structures, arranged within the customer region, via an optical sensor integrated within the mobile robotic system; and by a computer system:

accessing a feed of images captured by the mobile robotic system during the scan cycle, the feed of images depicting a set of inventory structures in the customer region of the store;

for each product type in a set of product types:

deriving a stock condition of a slot in an inventory structure, in the set of inventory structures, associated with the product type based on features extracted from a subset of images, depicting the slot, in the feed of images; and in response to the stock condition deviating from a target stock condition defined for the product type:

inserting the product type into a re-stock list comprising a set of re-stock product types; and generating a product flag, in a set of product flags, for the product type and corresponding to a location in a back-of-store inventory region of the store associated with stock of the product type;

accessing a first location of a mobile device, within the store, accessed by a user associated with the store; and in response to the first location falling within a threshold distance of a first product flag, in the set of product flags, corresponding to a first product type in the set of re-stock product types:

generating a re-stock notification comprising a prompt to deliver a first quantity of product units of the first product type from the back-of-store inventory region to a first slot in a first inventory structure, in the set of inventory structures, in the customer region of the store, the first slot assigned to the first product type; and transmitting the re-stock notification to the user via the mobile device.

13. The method of claim 12:

further comprising:

detecting the first slot, in the first inventory structure, in a first region of a first image in the feed of images;

extracting a first set of features from the first region of the first image;

detecting a first set of product units of the first product type occupying the first slot at the first time based on the first set of features;

deriving a first stock condition for the first product type in the first slot at the first time based on the first set of product units; and in response to the first stock condition deviating from a first target stock condition defined for the first product type:

inserting the first product type into the re-stock list; and generating the first geospatial flag for the first product type and corresponding to a first back-of-store inventory region associated with stock of the first product type.

14. The method of claim 12:

wherein accessing the feed of images comprises:

accessing a sequence of photographic images captured by the optical sensor in the mobile robotic system during the scan cycle while traversing an aisle in the store facing the first inventory structure; and compiling the sequence of photographic images into the first image defining a composite photographic image depicting a set of shelving segments spanning the first inventory structure.

15. The method of claim 12:

wherein deriving the stock condition of the slot in the inventory structure comprises, for the first slot, deriving a second quantity of product units of the first product type in the first slot; and wherein inserting the product type into the re-stock list in response to the stock condition deviating from the target stock condition comprises:

accessing a target quantity of product units defined for the first product type in the first slot; and in response to the second quantity of product units falling below the target quantity of product units, inserting the first product type into the re-stock list.

16. The method of claim 12:

wherein accessing the first location of the mobile device comprises accessing the first location of the mobile device at a first time succeeding the scan cycle;

further comprising accessing a set of point-of-sale data for the first product type during the scan cycle; and wherein deriving the stock condition for each product type in the set of product types comprises, for the first product type, deriving a first stock condition for the first product type in the first slot at a second time preceding the first time based on the set of point-of-sale data and features extracted from a first image, captured during the scan cycle, depicting the first inventory structure.

17. The method of claim 12:

wherein accessing the first location of the mobile device comprises accessing the first location of the mobile device at a first time succeeding the scan cycle;

wherein deriving the stock condition for each product type in the set of product types comprises, for the first product type, deriving a first stock condition for the first product type in the first slot at a second time preceding the first time based on features extracted from a first image, captured at a second time during the scan cycle, depicting the first inventory structure;

further comprising characterizing a confidence score for the first product type on the re-stock list based on a difference between the first time and the second time; and wherein generating the re-stock notification comprising the prompt to deliver the first quantity of product units of the first product type from the back-of-store inventory region to the first slot in the first inventory structure comprises generating the re-stock notification comprising the confidence score and a prompt to deliver the first quantity of product units of the first product type from the back-of-store inventory region to the first slot in the first inventory structure.

18. The method of claim 12:

further comprising:

accessing a second location of the first product flag in the back-of-store region of the store;

accessing a third location of the first slot in the first inventory structure in the customer region of the store;

accessing a map of the store comprising the back-of-store inventory region and the customer region;

deriving a first pathway between the first location of the user and the second location based on the map and the re-stock list; and deriving a second pathway between the second location and the third location based on the map and the re-stock list; and wherein generating the re-stock notification comprising the prompt to deliver the first quantity of product units of the first product type from the back-of-store inventory region to the first slot in the first inventory structure comprises generating the re-stock notification comprising the prompt to deliver the first quantity of product units of the first product type from the back-of-store inventory region to the first slot in the first inventory structure according the first pathway and the second pathway.

19. The method of claim 12:

wherein accessing the first location of the mobile device comprises accessing the first location of the mobile device at a first time;

further comprising, for each product type in the set of product types:

accessing a set of point-of-sale data corresponding to sales of the product type during an initial time period preceding the first time;

characterizing a difference between the stock condition and the target stock condition; and deriving an urgency score for re-stocking units of the product type based on the set of point-of-sale data and the difference; and wherein for each product type, in the set of product types, inserting the product type into the re-stock list in response to the stock condition deviating from the target stock condition, comprises, for each product type, in the set of product types, inserting the product type into the re-stock list in response to the stock condition deviating from the target stock condition and in response to the urgency score exceeding a threshold urgency.

20. A method comprising:

during a scan cycle, by a mobile robotic system, autonomously navigating throughout a store to capture images of inventory structures via an optical sensor integrated within the mobile robotic system; and by a computer system:

accessing a first image comprising visual data captured by a mobile device accessed by a user associated with the store, the first image associated with a first location in a back-of-store inventory region of the store;

based on features extracted from the first image, identifying a first product type, in a set of product types, represented in the first image;

accessing a second image of a first slot in a first inventory structure in a customer region of the store, the first slot assigned to the first product type, the second image captured at a second time preceding the first time by the mobile robotic system during the scan cycle;

based on features extracted from the second image, estimating a first stock condition for the first product type in the first slot at the second time;

accessing a first set of point-of-sale data associated with the first product type and corresponding to a first time period preceding the first time and succeeding the second time;

predicting a first quantity of product units of the first product type loaded in the first slot at the first time based on the first set of point-of-sale data and the first stock condition at the second time; and in response to the first quantity of product units falling below a threshold quantity:

generating a re-stock notification comprising a second quantity of product units of the first product type and a prompt to deliver the second quantity of product units from the back-of-store inventory structure to the first slot in the first inventory structure in the customer region of the store; and transmitting the re-stock notification to the user via the mobile device.

\* \* \* \* \*